US006853709B1

(12) United States Patent
Sakadjian

(10) Patent No.: US 6,853,709 B1
(45) Date of Patent: Feb. 8, 2005

(54) APPARATUS FOR DIRECT COMMUNICATION WITH A PHONE ENTRY SYSTEM

(75) Inventor: Hagop Sakadjian, Lake Forest, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/329,189

(22) Filed: Dec. 24, 2002

(51) Int. Cl.[7] ............................................ H04M 11/00
(52) U.S. Cl. ............................ 379/102.06; 379/102.01; 379/428.01
(58) Field of Search ....................... 379/102.06, 110.01, 379/90.01, 428.01, 437, 440, 355.01, 355.02, 354, 102.01; 345/184

(56) References Cited

U.S. PATENT DOCUMENTS 5,588,047 A  * 12/1996 Rosengren et al. ........... 379/27

FOREIGN PATENT DOCUMENTS

JP          09-297724     * 11/1997    .......... G06F/13/00

* cited by examiner

Primary Examiner—Melur Ramakrishnaiah
(74) Attorney, Agent, or Firm—Fitch, Even, Tabin & Flannery

(57) ABSTRACT

Disclosed is a security gate phone entry system that allows a person located at a security gate, that bars access into a secure area, to call an occupant within the secure area. The phone entry systems only communication connection port is a standard telephone line jack. Communication with phone entry unit can be established with the phone entry unit by connecting a standard telephone line to the unit. Alternatively, the phone entry unit can be connected directly to a computer with modem by using a telephone line simulator to connect the computer with modem to the telephone line jack of the phone entry unit. Additionally, the phone entry unit can be connected to a central control unit by a private communication line through a telephone line simulator connected to the telephone line jack.

9 Claims, 2 Drawing Sheets

APPARATUS FOR DIRECT COMMUNICATION WITH A PHONE ENTRY SYSTEM

FIELD OF THE INVENTION

The present invention relates to a security gate phone entry system and more particularly to a system and method to provide for direct communication with the phone entry system from a variety of sources.

BACKGROUND OF THE INVENTION

Communication units located at and functioning with a security gate entry system are well known in the art. Typically, these units are located adjacent to a moveable barrier or gate located at an entryway into an apartment complex or gated community. A person arriving at the entry will typically look up the number of the unit of the person they want to see on a display screen and then call that unit located within the complex on the security system telephone or similar communication apparatus located at the entryway. Once the person in the unit answers they can authorize opening of the gate to allow entry into the complex. Over the years these systems have become more sophisticated in what they can do. U.S. Pat. No. 5,854,831, for an Access Control Apparatus For Use With Buildings, Gated Properties And Their Like, owned by the assignee herein and incorporated herein by reference shows and describes a fairly sophisticated version of a telephone entry unit.

The unit described in the '831 patent includes a visual display and memory for holding information on the various occupants of units within the area to which access is restricted. This information often has to be updated as occupants move in and out. In the unit shown in the '831 patent includes an internal RAM memory, or other appropriate memory, to hold this information or it can be contained in PCMIA cards that fit into the top slot as depicted therein. Telephone entry units can also connect to and control functional parts of the gate opening systems. The units themselves can connect to the units of occupants within the restricted access area by a private communication line. In another variation the phone entry unit can actually connect into the public telephone system and when a person at the communication unit dials a code for a particular unit the telephone entry system will actually dial the telephone number of the unit being called.

Many of these communication entry units include dedicated computer systems that provide a variety of functions including diagnostic systems in additional to the standard occupant directories. In order to make the unit fully functional, electronic communication access ports have to be provided for a variety of situations. Among them are connectability to public telephone lines, to a hand held diagnostic unit or computer of a technician servicing the communication unit, and to a central control unit over a private communication line. To provide this functionality it has been necessary to provide a variety of different types of communication ports including a serial port, parallel port, RS 232 port and standard modular telephone jack. The unit described and depicted in the '831 patent includes most of these ports as well as a PCMCIA slot. All of these connections need there own circuitry as well as passive and active electronic parts including various computer chips in order to function properly. Thus, these communication units can have fairly sophisticated and redundant communication connections. These redundant features not only add significantly to cost and manufacturing complexity but also create a greater possibility of failure or malfunctioning of the unit.

Thus, there is there is a need to eliminate the excess redundancy in the circuitry of a communication entry unit while not sacrificing the connectability and functionality of these units.

SUMMARY

It is an objective of the present invention to provide a security gate phone entry unit that only requires a single type of connection port to establish a communicative link between the phone entry unit and a variety of different systems and devices. These include but are not limited to a public telephone line, a direct connection to a computer with a modem or a connection to a central control unit over a private communication line.

It is a further objective of the present invention to provide a phone entry unit that is easy and economical to manufacture and use, and does not include excessive or redundant circuitry.

The invention accomplishes these and other objectives by providing a phone entry unit with unitary direct connection capability, the phone entry unit having: a) a telephone unit with receiver and mouth piece; b) a standard telephone modular jack; c) a computer with cpu and memory operatively connected to the telephone unit; d) a modem operatively connected to the computing unit; e) audio signal router operatively connected to the modular jack, the modem and the telephone unit such that the router upon receipt of a signal received via a line connection to the modular jack identifies the signal received as being voice signal for the telephone unit or a signal from a computer and routes the signal received to either the telephone if it is voice communication signal or to the modem when it is a signal sent from another computer via modem; and f) wherein communication by voice or computer can be established between the phone entry unit by connecting a telephone line directly to the modular jack or connecting telephone line simulator to the modular jack and connecting a computer with modem to the telephone line simulator or connecting a telephone to the telephone line simulator.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

Figure 1:
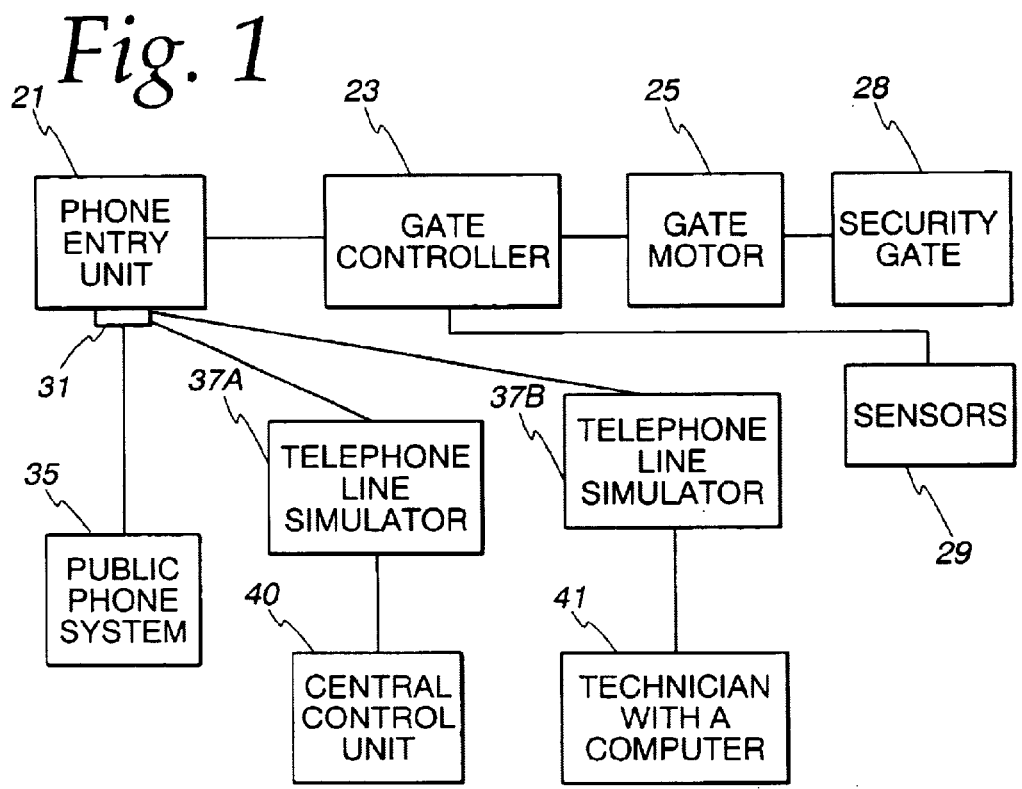
FIG. 1 is a schematic block diagram of a security system with which the present invention would function.

The present invention provides an improved means and method for communicating with a security or barrier phone entry system by a variety of means. It also provides a method and system that reduces the cost of manufacturing, installing and operating a phone entry system. FIG. 1 is a schematic block diagram of the major functional parts of a security gate system that would employee the present invention. Phone entry unit 21 connects to a gate controller 23, which controls the functioning of the security gate system including gate motor 25. In turn when gate motor 25 is activated it opens or closes security gate 28. Security gate 28 would be located at an access point into a limited access area such as an apartment complex, a gated community or some other type of facility requiring security. Additionally, gate controller 23 can also have various sensing devices 29 connected to it for detection of the presence of a vehicle or person adjacent to gate 28 or to monitor the operation of the entire system and warn of impending problems with the functioning of the system. One type of sensor could be magnetic loop detectors located in the roadways, not shown, adjacent to security gate 28.

Phone entry 21 in most respects is similar to the typical security gate phone entry units the particulars of which will be discussed below. Phone entry unit 21 has a modular telephone line connector 31, which allows the connection of phone entry unit 21 to a public telephone system 35. Additionally, by using a telephone line simulator 37A the entry unit can be connected by a private telephone line 39 to a central control unit 40. Alternatively, a technician 41 with a computer and standard modem could connect by telephone line simulator 37B to phone entry unit 21 via modular telephone connector 31.

Figure 2:
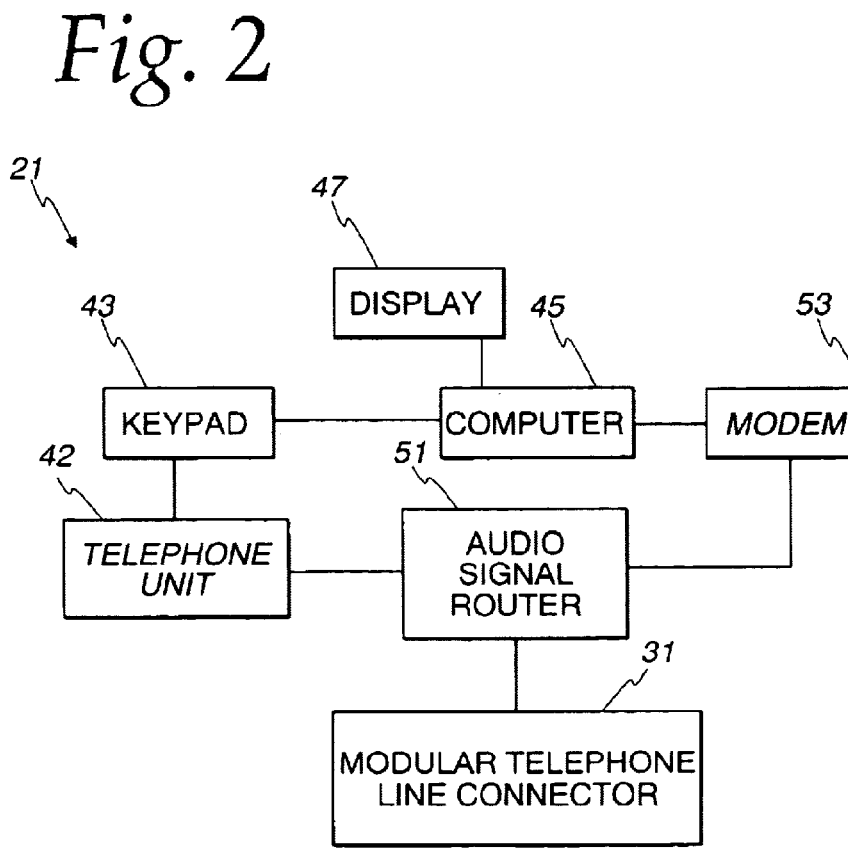
FIG. 2 is a schematic block diagram of the major functional components of a preferred embodiment of a phone entry unit of the present invention.

FIG. 2 provides a schematic block diagram of one preferred embodiment of the phone entry unit 21 of the present invention. Phone entry unit 21 can be configured in a variety of different ways and still be made according to the present invention. Phone entry unit 21 minimally has a standard type of telephone unit 42 with speaker and receiver, a keypad 43 to dial numbers of units within the restricted area as well as to access contact information, such as unit numbers saved in the memory of computer 45. Display 47 connects to computer 45 and provides a read out of contact information contained in a memory of computer 45 as well as other information or messages for a person using the telephone unit 42.

Phone entry unit 21 connects to a standard telephone line by a modular telephone line connector 31 commonly used in the commercial telephone industry. Such a standard telephone modular jack would be an RJ11 or similar modular connection unit. In turn modular telephone line connector 31 is connected to audio signal router 51. Audio signal router 51 determines if the incoming call is a voice communication call from a telephone or a communication signal from a computer. If the call is a voice signal from a telephone, audio signal router sends the signal to telephone unit 42. On the other hand if the incoming signal is from a computer communicating over the telephone line, it routes the signal to modem 53, which in turn connects to computer 45.

Voice communication by an individual seeking entry into the secure area at telephone unit 42 would in most instances involve calling a person at a unit within the restricted area or gated community. In turn the person in the unit contacted upon could allow admittance to the restricted area by sending a gate open signal by pressing the appropriate keys on their telephone keypad. The signal would be received by the telephone unit and signal computer 46 to open the gate or barrier blocking access to the restricted area. Communication with computer 46 by a connection over an exterior telephone line connected to modular telephone line connector 49 through router 51 and modem could be from a central control computer that might be connecting to computer 45 for a variety of reasons. Among them might be to update contact information on units within the restricted area complex, to run a diagnostic on the operation of the security gate system or a variety of other reasons.

At times there may be a need to connect to phone entry unit 21 by other than a public telephone line. Perhaps there may be a need to connect unit 21 into a local area network without use of a public telephone line. Also, a technician or other individual might have to make a direct connection to connect to computer 46 and update information etc. In the past, as noted above, this was accomplished by providing a variety of communications ports, such as a serial, parallel, RS 232 etc. Naturally, each of these ports required their own circuitry including special integrated chips to allow them to function. This made the unit, as depicted in U.S. Pat. No. 5,854,831 a much more complicated device. This also made it more expensive to manufacture and added additional features that could cause the phone entry unit to fail.

To remedy the above-mentioned possibilities all of the communication ports on unit 21 have been eliminated except for standard telephone line connection 31. To allow direct communication with unit 21 without the need to be connected to a public telephone line a telephone line simulator 37 is used. Thus, when a technician needs to directly connect to unit 21 to access computer 46 to update information or software running on computer 21 or to run a diagnostic test the technician only needs to connect his computer 45 through telephone line simulator 37B. As is well known in the industry a standard telephone line simulator enables two way communication between standard telecom products such as modems, fax machines and standard telephones.

Figure 3:
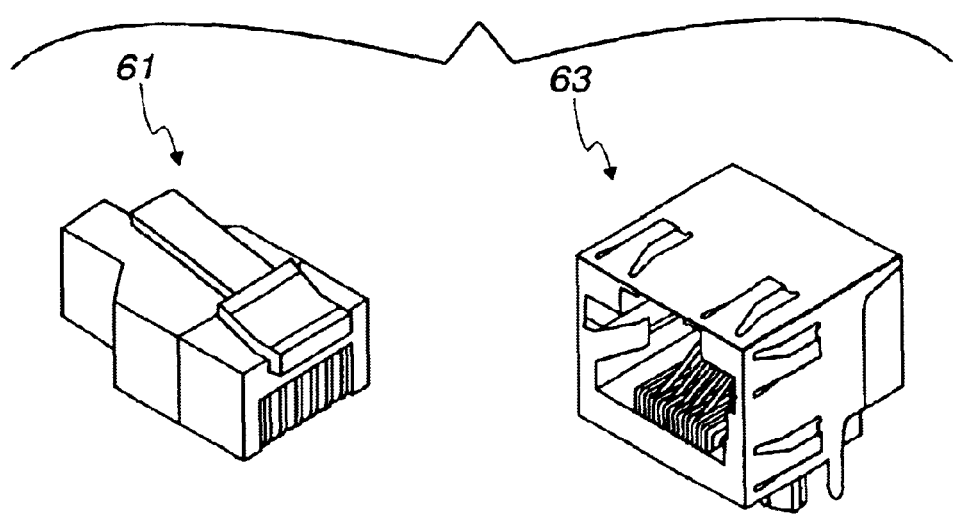
FIG. 3 presents a standard type of modular plug and outlet that might be used with the present invention.

Additionally, by using a telephone line simulator 37A a unit 21 could be put under direct control of a central control unit 40. The connection could use regular telephone line wire. Since this is not a connection using a standard serial, parallel or RS 232 port the distance between central control unit 40 and phone entry unit 21 is not Limited to 50 feet or less and can be several hundred feet or more. FIG. 3 provides a view of a standard type RJ 11 or RJ 45 or similar type of modular telephone plug 61 and outlet 63 that might be used with the present invention. However, the present invention would not be limited to these.

While the invention has been particularly shown and described with reference to a preferred embodiment thereof, it will be understood by those skilled in the art that various changes in form and detail may be made to it without departing from the spirit and scope of the invention.

What is claimed is:

1. A security system communication unit with unitary direct connection capability, said communication unit comprising:
   a) a telephone unit with receiver and mouth piece;
   b) a computer with cpu and memory operatively connected to said telephone unit;
   c) a modem operatively connected to said computing unit;
   d) a audio signal router operatively connected to said modem and to said telephone unit;
   e) a standard telephone modular jack connected to said audio signal router such that said router upon receipt of a signal received via a communication line connection to said modular jack identifies the signal received as being voice signal for the telephone unit or signal from a computer and routes the signal received to either the telephone if it is voice communication signal or to the modem when it is a signal sent from another computer via modem;
   f) wherein said computer controls a gate controller and various diagnostic and sensing units of said gate controller.

2. The unit of claim 1 wherein said communication line connection can be selected from one of the following group: a public telephone line connected to said modular jack for communication over telephone lines by voice or computer or a second computer with a modem operatively attached to said to said modular telephone line jack through a telephone line simulator and thereby a direct connection can be established between said computer and said phone entry unit.

3. The unit of claim 1 wherein a public telephone line connection is made with said modular telephone line jack.

4. The unit of claim 1 wherein a technician with a computer and modem operatively connected to the computer connects b a telephone line simulator directly to said modular telephone jack to thereby establish communication with said unit.

5. A security system communication unit with unitary direct connection capability, said communication unit comprising:
   a) a telephone unit with receiver and mouth piece;
   b) a computer with cpu and memory operatively connected to said telephone unit;
   c) a modem operatively connected to said computing unit;
   d) a audio signal router operatively connected to said modem and to said telephone unit;
   e) a standard telephone modular jack connected to said audio signal router such that said router upon receipt of a signal received via a communication line connection to said modular jack identifies the signal received as being voice signal for the telephone unit or signal from a computer and routes the signal received to either the telephone if it is voice communication signal or to the modem when it is a signal sent from another computer via modem; and
   f) wherein said computer includes a display and keyboard and thereby provides address and phone contact numbers of units within a secure area of said security system to thereby allow individuals at said unit to contact specific units with the secure area.

6. A security system phone entry unit with unitary direct connection capability, said phone entry unit comprising:
   a) a telephone unit with receiver and mouth piece;
   b) a computer with cpu and memory operatively connected to said telephone unit;
   c) a modem operatively connected to said computing unit;
   d) a audio signal router operatively to said modem and to said telephone unit;
   e) a standard telephone modular jack connected to the telephone unit to allow the telephone to connect to said audio signal router such that said router upon receipt of a signal received via a line connection to said modular jack identifies the signal received as being voice signal for the telephone unit or a signal from a computer and routes the signal received to either the telephone if it is voice communication signal or to the modem when it is a signal sent from another computer via modem;
   f) wherein communication by voice or computer can be established between said phone entry unit by one of the following forms: connecting a telephone line directly to said modular jack, connecting telephone line simulator to said modular jack and connecting a computer with modem to said telephone line simulator or connecting a telephone to said telephone line simulator; and
   g) wherein said computer controls a gate controller and various diagnostic and sensing units of said gate controller.

7. The unit of claim 6 wherein a public telephone line connection is connected to said modular telephone line jack.

8. The unit of claim 6 wherein a technician with a computer and modem operatively connected to the computer connects by said telephone line simulator directly to said modular telephone jack.

9. A security system phone entry unit with unitary direct connection capability, said phone entry unit comprising:
   a) a telephone unit with receiver and mouth piece;
   b) a computer with cpu and memory operatively connected to said telephone unit;
   c) a modem operatively connected to said computing unit;
   d) a audio signal router operatively to said modem and to said telephone unit;
   e) a standard telephone modular jack connected to the telephone unit to allow the telephone to connect to said audio signal router such that said router upon receipt of a signal received via a line connection to said modular jack identifies the signal received as being voice signal for the telephone unit or a signal from a computer and routes the signal received to either the telephone if it is voice communication signal or to the modem when it is a signal sent from another computer via modem;
   f) wherein communication by voice or computer can be established between said phone entry unit by one of the following forms: connecting a telephone line directly to said modular jack, connecting telephone line simulator to said modular jack and connecting a computer with modem to said telephone line simulator or connecting a telephone to said telephone line simulator; and
   g) wherein said computer includes a display and keyboard and thereby provides address and phone contact numbers of units with a secure area of said security system to thereby allow individuals at said unit to contact specific units within the secure area.

* * * * *

UNITED STATES PATENT AND TRADEMARK OFFICE
CERTIFICATE OF CORRECTION

PATENT NO. : 6,853,709 B1
DATED : February 8, 2005
INVENTOR(S) : Hagop Sakadjian It is certified that error appears in the above-identified patent and that said Letters Patent is hereby corrected as shown below:

Column 4,
Line 51, change "a" to -- an --.
Line 57, after "being" insert -- a --.
Line 57, after "or" insert -- a --.
Line 59, after "is" insert -- a --.
Line 61, after "modem;" insert -- and --.
Line 66, change "group" to -- groups --.

Column 5,
Lines 2-3, change "attached to said to said" to -- attached to said --.
Line 10, change "b" to -- by --.
Line 20, change "a" to -- an --.
Lines 27 and 50, after "being" insert -- a --.
Line 27, after "or" insert -- a --.
Line 29, after "is" insert -- a --.

Column 6,
Lines 1-2 and 35-36, after "is" insert -- a --.
Lines 27 and 44, change "a" to -- an --.
Lines 33 and 50, after "being" insert -- a --.

Signed and Sealed this

Thirteenth Day of September, 2005

JON W. DUDAS
*Director of the United States Patent and Trademark Office*